United States Patent
Tokkonen et al.

(10) Patent No.: US 7,912,424 B2
(45) Date of Patent: Mar. 22, 2011

(54) ACTUATING FUNCTIONALITY IN ELECTRONIC DEVICE

(75) Inventors: Timo Tokkonen, Oulu (FI); Ilkka Tiainen, Espoo (FI)

(73) Assignee: Nokia Corporation, Espoo (FI)

( * ) Notice: Subject to any disclaimer, the term of this patent is extended or adjusted under 35 U.S.C. 154(b) by 620 days.

(21) Appl. No.: 10/591,762

(22) PCT Filed: Mar. 9, 2004

(86) PCT No.: PCT/FI2004/000128
§ 371 (c)(1),
(2), (4) Date: Sep. 1, 2006

(87) PCT Pub. No.: WO2005/086042
PCT Pub. Date: Sep. 15, 2005

(65) Prior Publication Data
US 2007/0205874 A1 Sep. 6, 2007

(51) Int. Cl.
*H04B 7/00* (2006.01)

(52) U.S. Cl. ........................ 455/39; 455/41.2; 340/10.51

(58) Field of Classification Search ........ 455/41.1–41.3; 340/10.1, 10.51–10.52, 572.1
See application file for complete search history.

(56) References Cited

U.S. PATENT DOCUMENTS

| | | | |
|---|---|---|---|
| 6,618,162 B1 | 9/2003 | Wiklof et al. | |
| 6,655,586 B1 * | 12/2003 | Back et al. | 235/382 |
| 6,677,852 B1 * | 1/2004 | Landt | 340/10.1 |
| 6,860,422 B2 * | 3/2005 | Hull et al. | 235/376 |
| 6,924,781 B1 * | 8/2005 | Gelbman | 345/85 |
| 6,983,124 B1 * | 1/2006 | Bayley et al. | 455/41.2 |
| 7,075,412 B1 * | 7/2006 | Reynolds et al. | 340/10.2 |
| 7,099,496 B2 * | 8/2006 | Benkley, III | 382/124 |
| 7,240,831 B2 * | 7/2007 | Hepworth et al. | 235/380 |
| 7,478,758 B2 * | 1/2009 | Pate | 235/492 |
| 7,580,678 B2 * | 8/2009 | Byman-Kivivuori et al. | 455/41.2 |
| 2001/0045460 A1 | 11/2001 | Reynolds et al. | |
| 2002/0000470 A1 * | 1/2002 | Lanzaro et al. | 235/462.45 |
| 2002/0116268 A1 * | 8/2002 | Fukuda | 705/14 |
| 2003/0095032 A1 * | 5/2003 | Hoshino et al. | 340/5.92 |
| 2004/0002305 A1 | 1/2004 | Byman-Kivivuori et al. | |
| 2004/0095241 A1 * | 5/2004 | Maloney | 340/568.1 |
| 2004/0198438 A1 * | 10/2004 | Song et al. | 455/556.1 |
| 2004/0267917 A1 * | 12/2004 | Tokkonen et al. | 709/223 |
| 2005/0070257 A1 * | 3/2005 | Saarinen et al. | 455/414.1 |
| 2005/0175973 A1 * | 8/2005 | Miller | 434/317 |
| 2006/0044153 A1 * | 3/2006 | Dawidowsky | 340/825.22 |
| 2006/0202827 A1 * | 9/2006 | Volpi et al. | 340/572.1 |
| 2006/0220865 A1 * | 10/2006 | Babine et al. | 340/572.1 |
| 2006/0240806 A1 * | 10/2006 | Demirbasa et al. | 455/412.1 |

(Continued)

FOREIGN PATENT DOCUMENTS

CN 1157950 A 8/1997

(Continued)

*Primary Examiner* — Simon D Nguyen
(74) *Attorney, Agent, or Firm* — Hollingsworth & Funk, LLC

(57) ABSTRACT

Arrangement for providing operational settings to an electronic device including a data storage, including at least one data storage element including instructions needed to perform one or more functions in the electronic device. The electronic device includes reading means for reading one or more of the plurality of data storage elements, the electronic device further including controlling means for performing one or more functions defined by the instructions included in the read data storage element included in the data storage.

21 Claims, 4 Drawing Sheets

U.S. PATENT DOCUMENTS

| | | | |
|---|---|---|---|
| 2007/0075832 A1* | 4/2007 | Morse et al. | 340/10.1 |
| 2007/0152825 A1* | 7/2007 | August et al. | 340/572.1 |
| 2007/0236350 A1* | 10/2007 | Nystrom et al. | 340/572.1 |
| 2009/0115573 A1* | 5/2009 | Naressi et al. | 340/10.1 |

FOREIGN PATENT DOCUMENTS

| | | |
|---|---|---|
| WO | WO 01/37204 | 5/2001 |
| WO | WO 01/37204 A1 * | 5/2001 |
| WO | WO 0137204 A1 * | 5/2001 |

* cited by examiner

ACTUATING FUNCTIONALITY IN ELECTRONIC DEVICE

FIELD OF THE INVENTION

The present invention relates to actuating functionality in an electronic device.

BACKGROUND OF THE INVENTION

Electronic devices have a continuously increasing number of functions and applications included. Providing the user information on functions/applications included in a device, and especially new applications, has not been solved in a satisfactory manner. User manuals in their current format do not give sufficient support for a user in getting familiar with a device and solving possible problems when using the device. That is, user manuals are sometimes unclear in their instructions and following written instructions is often a time-consuming activity.

Therefore, there is a need to provide a solution to how a user could automatically run a new application in an electronic device and how a user could efficiently solve possible problem situations when using the device.

BRIEF DESCRIPTION OF THE INVENTION

It is thus an object of the present invention to improve the ways how to operate electronic devices. In one embodiment of the invention, there is provided an arrangement for performing functionality in an electronic device. The arrangement includes a data storage, including at least one data storage element including instructions needed to perform at least one function in the electronic device, wherein the electronic device includes reading means for reading the data storage element, the electronic device further including controlling means for performing at least one function defined by the instructions included in the read data storage element included in the data storage.

In one embodiment of the invention, there is provided an electronic device, including reading means for reading at least one data storage element, and controlling means for performing one or more functions on the basis of the read data storage element.

In one embodiment of the invention, there is provided a data storage. The data storage includes at least one data storage element, the element including instructions needed to perform an operational function in an electronic device.

In one embodiment of the invention, there is provided a method for initiating functionality in an electronic device, the method comprising reading, by using the device, at least one data storage element from a data storage, the element including instructions needed to perform at least one function in the electronic device, performing, in the electronic device, at least one function defined by the instructions included in the one or more read data storage elements included in the data storage.

The data storage according to the invention can be a user manual, for instance. Then, the user is able to locate a solution to a problem in the user manual and can perform operating settings by reading a data storage element that solves the problem from the manual. In another embodiment of the invention, the data storage refers to a selling box in which the electronic device, such as a mobile phone, is sold. People are often faithful to the phone mark and only buy new versions of the same mark they have used before. In such cases, when buying a new phone, the buyer basically knows most of the features included in the device from his/her past experience from using a previous version of the phone mark. In such a situation, the user would only be interested in the most important new features in comparison to the previous version and thus the selling box could be utilized as an important tool for informing the user about and introducing him to the new features in the phone. In addition to the given examples, data storage can also refer to a street advertisement, a postcard, a wall in a public building, or some similar structure allowing a data storage element to be fastened to.

A data storage element that is included in the data storage refers to a radio frequency (RF) tag, for instance. The data storage element can also be a barcode, a www address, invisible data or some corresponding entity that is capable of storing data that can be read by an external reading device. In the invention, the data storage contains a plurality of said data storage elements and the user of the electronic device can choose a desired data storage element to perform a certain operational function in the electronic device. Data storage elements are so positioned in the data storage that there is no or at least a very little risk of reading an unintended data storage element.

The invention provides the significant advantage of being able to perform sometimes tedious and complex functions by simply locating a suitable data storage element and using the electronic device to read the located data element. Additionally, new applications associated with the device can easily be run and tried out.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The invention is in the following illustrated by referring to the accompanied drawings, where FIGS. 1A to 1C refer to embodiments of the method. Step 110 in FIG. 1A refers to reading, by using the electronic device, one or more data storage elements from a plurality of data storage elements that are included in a data storage. According to step 112, operational function(s) that correspond to the one or more read data storage elements, are performed in the electronic device.

Figure 1A:
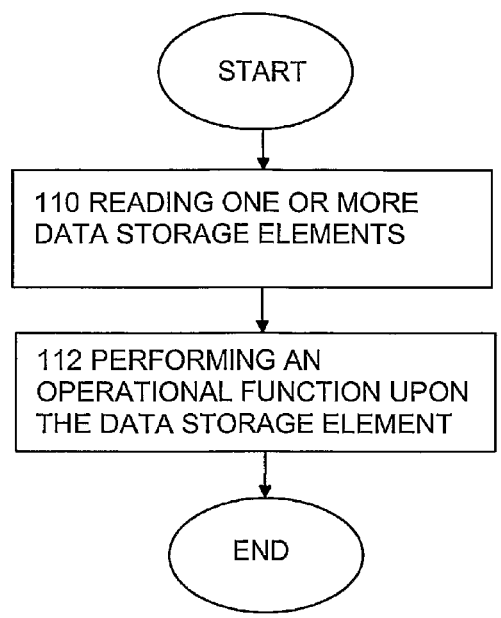
FIG. 1A illustrates one embodiment of the method according to the invention.
Figure 1B:
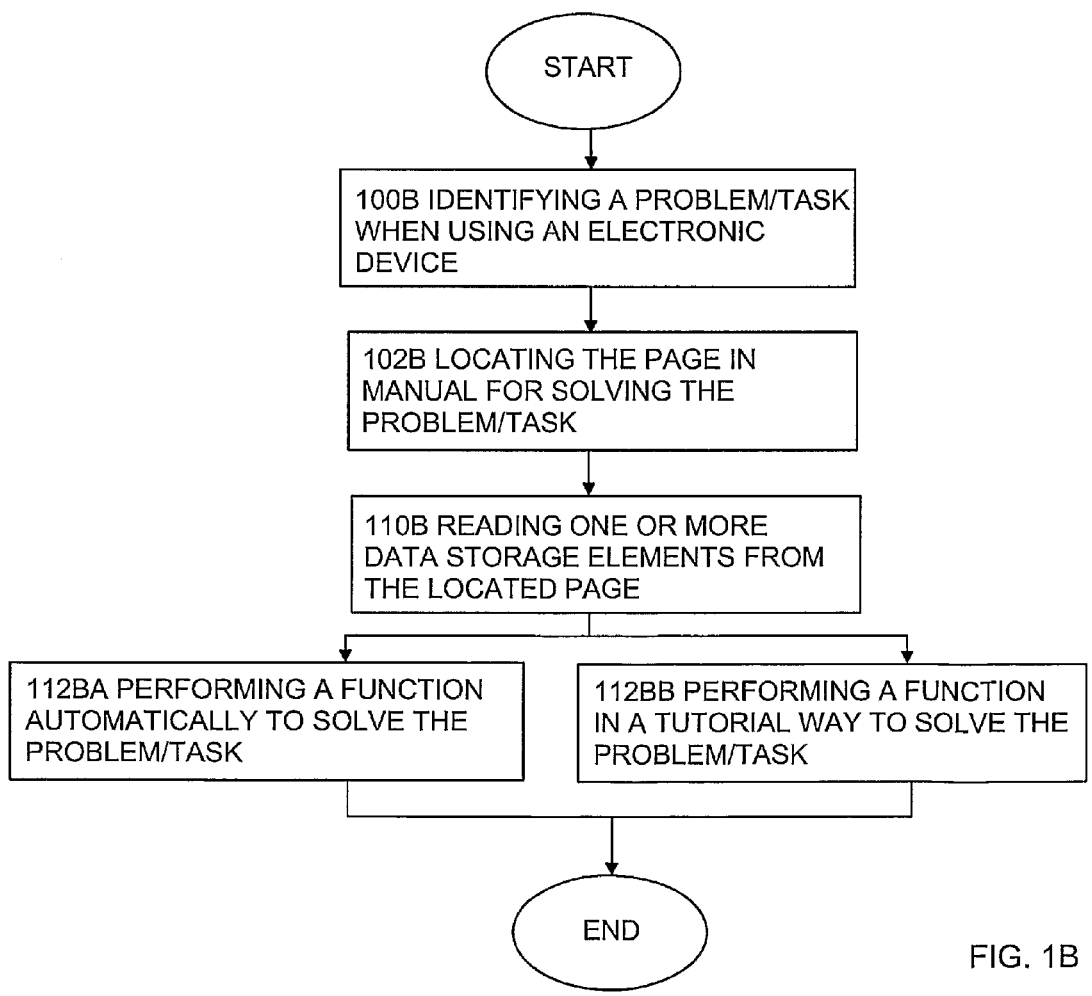
FIG. 1B illustrates another embodiment of the method according to the invention.

FIG. 1B specifies the method in FIG. 1A. In FIG. 1B, it is assumed that the data storage is an operating manual containing instructions for operating the electronic device. At least some of the pages of the manual are equipped with data storage elements, such as RF tags that can be read by the electronic device, which contains a reader. Data storage elements can be positioned on the pages of the manual in such a way that erroneous reading of a tag is avoided. For instance, if pages 9 and 10 form a double page of the manual and the user wishes to read a tag on page 10, one must avoid reading a possibly existing tag on page 9, and also avoid reading a tag on other even pages (8, 6, etc.) which are under page 10 in the manual. One way to avoid erroneous reading of tags residing on the same double page is to place tags far enough from each other. For instance, if the maximal reading distance from a tag is 5 cm, tags on the same double page could be placed at least 8 cm from each other. Tags on overlapping, such as even, pages could be placed so that on page 8 the tag is at the top of the page, whereas on page 10 the tag could be placed at the bottom of the page. One way to avoid erroneous reading of a tag is to set the reading distance so short that the electronic device practically has to touch the tag in order to be able to read it.

Step 100B refers to a situation where the user of the electronic device has encountered a problem when using the electronic device or for some reason wishes to change the settings of the device. An example of such a situation is the setting of a PIN (Personal Identification Number) code, that is, the access code for protecting the SIM (Subscriber Identity Module) card against unauthorized use. Then, the user could according to step 102B locate the page in the manual that describes the steps to be taken when setting the PIN code.

Then, instead of manually performing the disclosed functions by using the keyboard of the electronic device, the user can place the electronic device close to the RF tag on the located page. When the electronic device is close enough to the tag, the information included in the tag is read according to step 110B. Step 112BA performs the functions in the mobile phone in an automatic manner so that the desired end result is achieved. In the case of setting a PIN code, the phone could then directly jump to the menu item requesting a new PIN code so that user does not need to navigate in the menu structure of the phone to locate the desired menu item.

Step 112BB refers to performing the operational functions in a tutorial manner, that is, the electronic device shows the user step by step the functions to be performed. In setting a PIN code, the operation of the device could be such that the device displays one by one the hierarchical menu items to follow, for instance, Menu→Settings→Security Settings→PIN Code Request→Enter PIN Code. The device could go in step-by-step manner from one level to the next level automatically after five seconds, for instance, or the length of the time when to proceed to the next level could be set by the user. In one embodiment, the user can adjust the stepping time during the tutoring, that is, the user can indicate that the device should make step transitions faster or slower. Alternatively, the device can at each stage wait until the user presses a key before proceeding to the next menu item in the menu structure.

The menu structure of an electronic device may be considered to be a state machine, where jumping between menu items corresponds to state transitions in the state machine. Correspondingly, a tag may contain a macro or another corresponding set of instructions for performing necessary state transitions in the state machine.

In one embodiment of the invention, the data storage element contains a software code, which can be read by the device. The controller of the device may either add the read software code portion to an existing software base in the device, or it may replace a software code portion in the device. One example is a filter for a graphics application. A data storage element could contain a new filter, which the user could try out by reading the filter software by the device. Usage of the read software can be limited by the number of usage times, for instance. Alternatively, certain time period may be set during which the read software code can be run on the device.

The data that is read from a data storage element, such as a tag, is not limited to the examples given above. The data content may also be a media content, such as a ring tone. Then, by reading the ring tone, the tone may be added to the existing ring tone base in the device. The data content may also be of a visual character. One example of such is a holiday resort specific picture frame, for instance. The specific picture frame could be added to a picture taken in that resort.

Figure 1C:
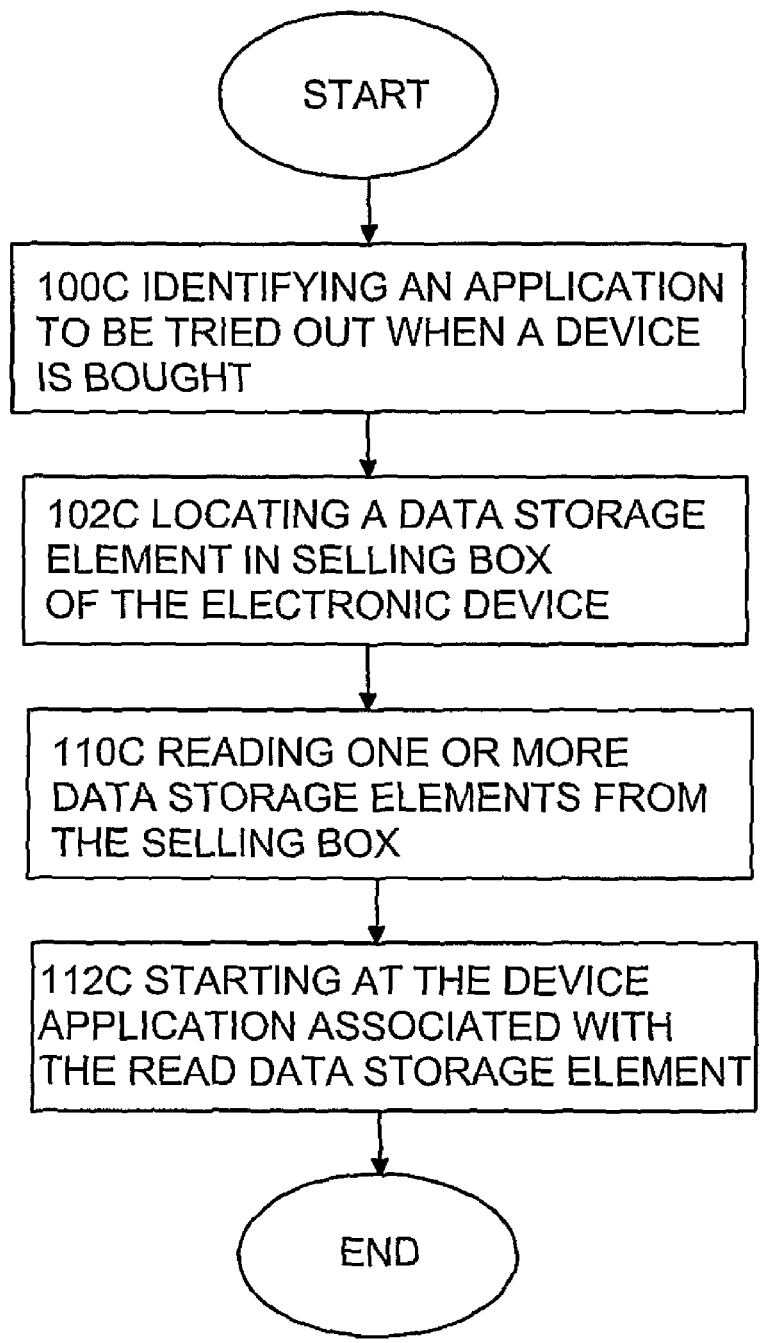
FIG. 1C illustrates still another embodiment of the method according to the invention.

FIG. 1C shows another embodiment specifying the method disclosed in FIG. 1A. FIG. 1C relates to a situation where a user has purchased an electronic device, such as a mobile phone. The device is usually sold in a selling box made of cardboard, for instance. In the embodiment illustrated by FIG. 1C, the selling box includes one or more data storage elements illustrating functionalities that the phone maker especially wishes to introduce to a buyer of the phone.

Step 100C refers to identifying a new functionality or application associated with the device. The buyer of the phone can become aware of new functionality by advertising from the seller of the device or by getting information on the new application from the selling box, for instance.

For instance, if a phone includes a new type of alarm clock functionality, the phone maker may provide the selling box with a tag introducing this new functionality to the user. Step 102C refers to locating of the tag in the selling box. The locating of the tag can be made easier by printing some illustrative text or figures on the box. Then, according to step 110C, when the user has located the desired tag and wants to try the new application associated with the device, all that is needed is to read the tag from the selling box by using the electronic device. Then the phone starts the selected application according to step 112C.

Figure 2A:
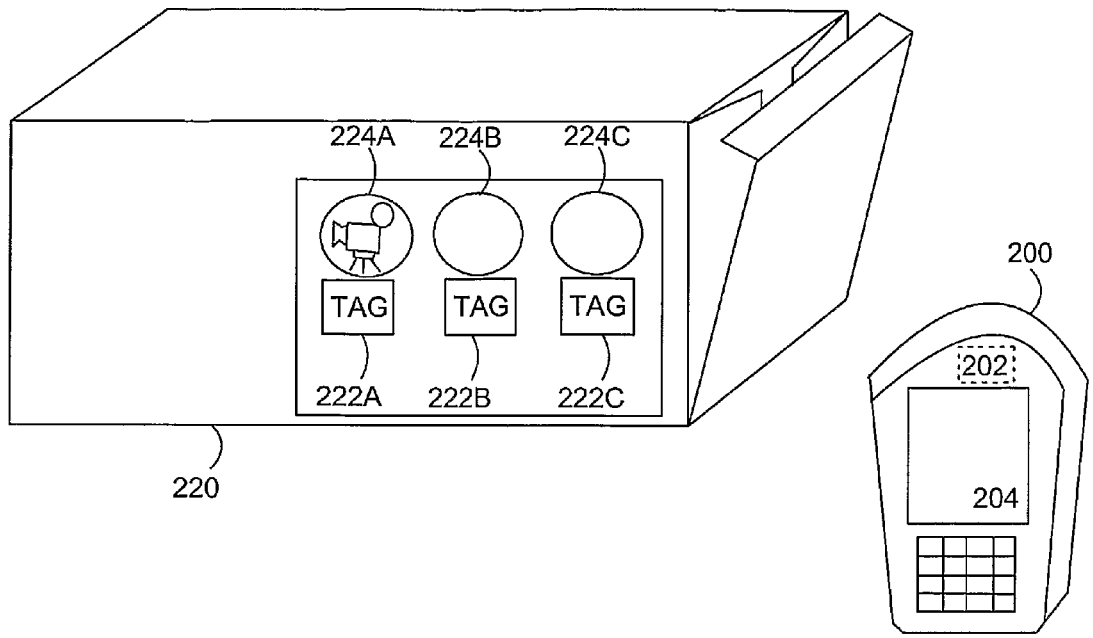
FIGS. 2A and 2B illustrate one usage example of an arrangement according to the invention.
Figure 2B:
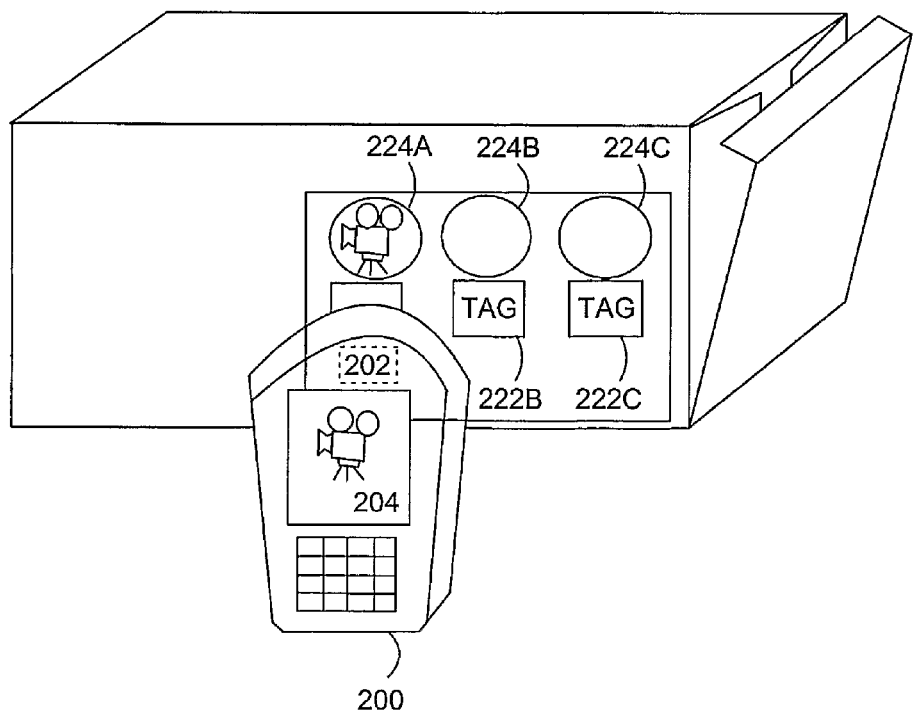

FIGS. 2A and 2B relate to the method illustrated by FIG. 1C. In FIG. 2A, the user has removed the electronic device 200 from the selling box 220. The electronic device includes reading means 202 for reading one or more of the RF tags 222A to 222C included in the selling box 220. The selling box 220 can also include an identifier 224A to 224C, such as a picture and/or text, for each tag 222A to 222C. If the selling box 220 is made of cardboard, the tags 222A to 222C could be embedded into the cardboard or glued to the surface of the selling box 220, for instance. Tags 222A to 222C could also be printed or painted or formed in another corresponding manner to the selling box 220.

FIG. 2B shows how the reading means 202 of the electronic device 200 have been moved into the proximity of the tag 222A. Display 204 of the electronic device 200 highlights initiation of the application provoked by the tag 222A. The tags 222A to 222C are so positioned on the selling box 220 that the reading of two tags simultaneously by using the phone 200 is avoided. The tags can either be positioned far enough from each other or by making the reading distance of the tags very short.

Figure 3:
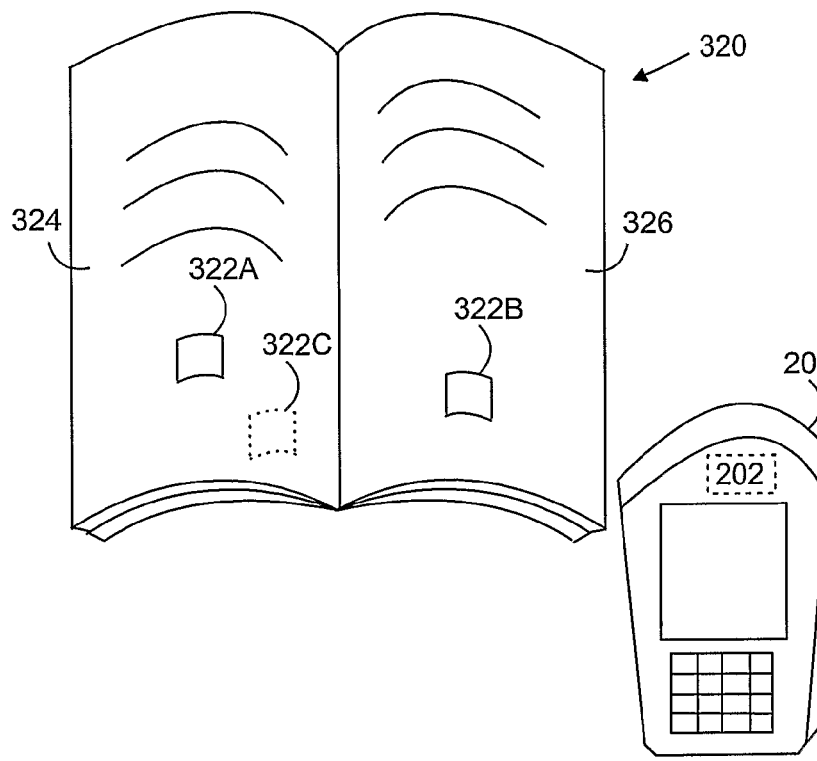
FIG. 3 illustrates another usage example of an arrangement according to the invention.

In addition to the given examples, such as a user manual and a selling box, data storage elements may be placed in a multitude of places. Storage elements can be placed on street advertisements and they can be sent on a postcard. The latter may be especially useful when registered buyers of a device can be rewarded by sending them a postcard containing some extra data storage elements. Furthermore, data storage elements may be available in public places. One example is an airport having a tag which sets the clock of the mobile phone to the local time of the airport. FIG. 3 illustrates another embodiment of an arrangement according to the invention.

The arrangement includes a user manual 320 of the electronic device 200. The user manual contains on a double page pages 324 and 326 and each page contains a respective data storage element, 322A and 322B, such as an RF tag. It can be seen that tags 322A and 322B are positioned far away from each other so that when the reader 202 of the electronic device 200 is utilised, only one of the tags 322A and 322B will be read at a time. FIG. 3 also shows a third tag 322C that is on a page under page 324. Tags 322A and 322C are positioned so that they do not overlap with each other in order to reduce the risk of unintentionally reading tag 322C when intending to read tag 322A.

Figure 4:
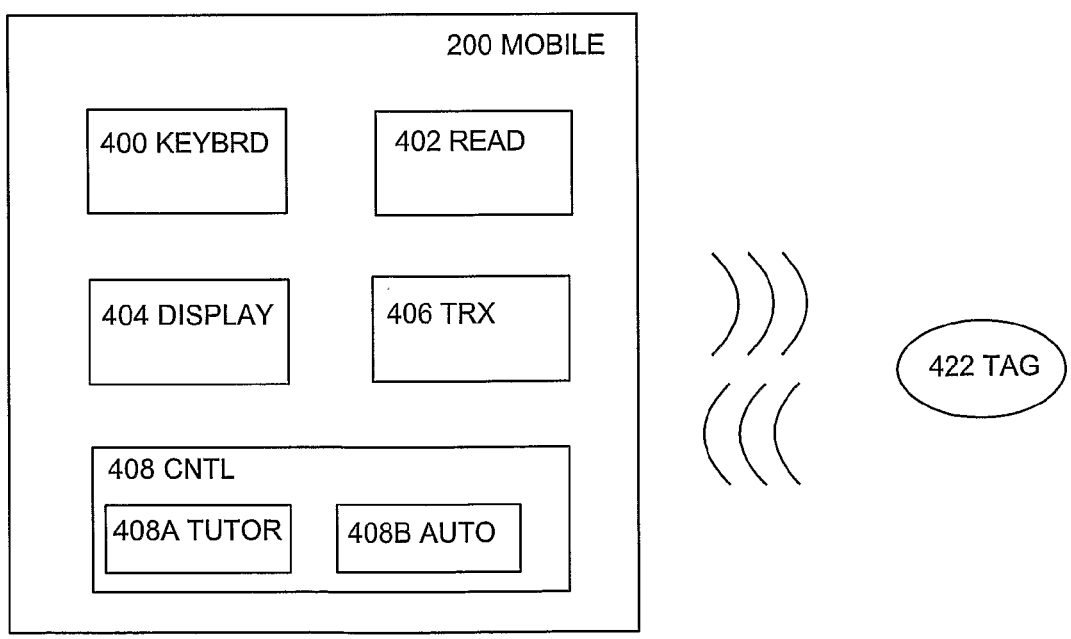
FIG. 4 shows one embodiment of an electronic device according to the invention.

FIG. 4 illustrates the structure of the electronic device 200, such as a mobile phone, as a block diagram. The device 200 can include inputting means 400, which can be a keyboard, for instance. The inputting means may be needed when the information included in a data storage element 422 is shown to the user in a tutorial way and input from the user is needed. The device also contains reading means 402 for reading from the data storage element 422 and/or writing to the element. Depending on the structure of the data storage element 422, the reader 402 can be adapted to be able to read information from one or more different types of data storage elements, such as RF tags, barcodes, www addresses, hidden texts and so on. The reader 402 can be implemented in a known manner and does not need to be described in detail here.

The electronic device 200 can also contain outputting means 404, which can be implemented as a display and/or a loudspeaker, for instance. The outputting means 404 can thus inform/instruct a user visually and/or by sound of an operational function that is performed on the basis of a read data storage element. In case the electronic device 200 is a mobile phone, the device includes a transceiver 406 for receiving and transmitting user data between the mobile phone and a mobile network.

The electronic device also contains a controller 408 that implements the operational function on the basis of the information included in a read data storage element.

In one embodiment, the controller 408 contains tutoring means 408A, which is arranged to implement the operational function in a tutorial way. Then, the controller 408 can utilize other resources of the device, such as the outputting means 404 for displaying information on a display or giving sound instructions via the loudspeaker of the device. Tutoring means 408A can also take inputs from the user via the inputting means 400 of the device. In another embodiment, the controller 408 contains an automatic implementing means 408B, which is arranged to perform an operational function automatically based on the information read from a data storage element. Automatic implementing means 408B can be activated when the reader reads a tag from a selling box and a corresponding operational function shall be performed automatically. Automatic implementing means 408B can also be activated when a user reads a solution to a problem from a user manual, and the device implements the corresponding operational function automatically.

Functionality of the controller 408 can be implemented as software, for instance, on a processor of the electronic device 200. Instead of software, the controller can be implemented as ASIC (Application Specific Integrated Circuit) or as separate logic components.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement comprising:
an electronic device comprising a reader configured for machine reading radio frequency tags; and
a user manual associated with the electronic device, including a plurality of radio frequency tags attached on the pages of the user manual such that each radio frequency tag is machine readable separately by the electronic device without interference from other radio frequency tags attached in the user manual, at least one radio frequency tag including software instructions relating to an operation described in the manual and associated with said radio frequency tag;
wherein the electronic device is configured, in response to the reader machine reading at least one of the plurality of radio frequency tags attached in the user manual and including software instructions, to execute the software instructions read from said at least one radio frequency tag to perform a device operation that is described in the user manual in connection with said at least one radio frequency tag.

2. The arrangement of claim 1, wherein the device operation is performed automatically.

3. The arrangement of claim 2, wherein the device operation is performed in a tutorial way.

4. The arrangement of claim 3, wherein the tutorial way proceeds in a step-by-step manner, and the device operation proceeds to a next step when a predefined or user-adjustable time has elapsed.

5. The arrangement of claim 3, wherein when performing the device operation in the tutorial way, the operation proceeds in a step-by-step manner by taking proceed indications from a user of the device.

6. The arrangement of claim 1, wherein read software instructions are added to an existing software code in the device or replace an existing software code portion in the device.

7. The arrangement of claim 6, wherein usage of the read software instructions is limited to a predetermined number of usage times or to a predetermined time.

8. The arrangement of claim 1, wherein the radio frequency tags include information for starting an application at the electronic device.

9. The arrangement of claim 1, wherein the electronic device is a mobile phone.

10. The arrangement of claim 1, wherein the radio frequency tags are positioned on different ends of neighboring pages of the user manual.

11. The arrangement of claim 1, wherein the radio frequency tags have a reading distance such that they are readable only by touching the radio frequency tag with the reader of the electronic device.

12. The arrangement of claim 1, wherein the arrangement includes a selling package.

13. An electronic device comprising:
a reader for reading any of a plurality of radio frequency tags from a user manual associated with the electronic device, the user manual including the plurality of radio frequency tags on the pages of the user manual positioned such that they are machine readable separately by the electronic device without interfering with each other, at least one radio frequency tag storing software instructions relating to a device operation described in the user manual and associated with said radio frequency tag, wherein the electronic device further includes a controller configured, in response to machine reading at least one of the plurality of radio frequency tags attached in the user manual and including software instructions, to execute the software instructions read from said at least one radio frequency tag to perform a device operation that is described in the user manual in connection with said at least one radio frequency tag.

14. The device of claim 13, wherein the controller is configured to start an application in the device.

15. The device of claim 13, wherein the controller is configured to illustrate performing of an operational setting in a step-by-step manner, step transitions being triggered by expiry of a timer or by pressing of a key of the device.

16. The device of claim 13, wherein the reader is configured to read a software code portion from a radio frequency tag and the controller is configured to add the software code portion to an existing code base in the device.

17. The device of claim 13, wherein the reader is configured to read a software code portion from a radio frequency tag and the controller is configured to replace an existing software code portion in the device with the read software code portion.

18. The device of claim 13, wherein the reader is configured to read a media content from a radio frequency tag and the controller is configured to add the media content to a media base of the device.

19. A user manual comprising a plurality of radio frequency tags, at least one radio frequency tag storing software instructions relating to a device operation described in the user manual, the radio frequency tags being attached on the pages of the user manual such that each radio frequency tag is machine readable without interference from other radio frequency tags in the user manual.

20. A method comprising:
reading, by using an electronic device, at least one radio frequency tag from a user manual including a plurality of radio frequency tags attached on the pages of the user manual such that each radio frequency tag is machine readable without interference from other radio frequency tags in the user manual, at least one radio frequency tag storing software instructions relating to a device operation described in the user manual and associated with the radio frequency tag,
performing, in the electronic device, on the basis of the software instructions read from at least one radio frequency tag, a device operation that is described in the user manual in connection with said at least one read radio frequency tag.

21. The method of claim 20, further comprising locating, in the user manual, a page describing a solution to a problem that a user has encountered when using the electronic device, and reading the radio frequency tag residing in the located page to solve the problem at the electronic device.

* * * * *